United States Patent
Chang et al.

(10) Patent No.: US 9,608,259 B2
(45) Date of Patent: Mar. 28, 2017

(54) POSITIVE ELECTRODE FOR SECONDARY BATTERY

(75) Inventors: Sung Kyun Chang, Daejeon (KR); Sinyoung Park, Daejeon (KR); Hong-Kyu Park, Daejeon (KR); Jinhyung Lim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/469,783

(22) Filed: May 11, 2012

(65) Prior Publication Data

US 2012/0288764 A1  Nov. 15, 2012

Related U.S. Application Data

(63) Continuation of application No. PCT/KR2011/002230, filed on Mar. 31, 2011.

(30) Foreign Application Priority Data

Apr. 1, 2010 (KR) .......... 10-2010-0029723

(51) Int. Cl.
| | |
|---|---|
| H01M 4/13 | (2010.01) |
| H01M 4/36 | (2006.01) |
| H01M 4/58 | (2010.01) |
| H01M 4/505 | (2010.01) |

(Continued)

(52) U.S. Cl.
CPC .......... *H01M 4/13* (2013.01); *B60L 11/1879* (2013.01); *H01M 4/364* (2013.01); *H01M 4/505* (2013.01); *H01M 4/525* (2013.01); *H01M 4/5825* (2013.01); *Y02E 60/122* (2013.01); *Y02T 10/7005* (2013.01); *Y02T 10/705* (2013.01); *Y02T 10/7011* (2013.01)

(58) Field of Classification Search
CPC ..... H01M 4/364; H01M 4/525; H01M 4/5825
USPC ............. 429/209–246; 252/500–521.6; 423/445 R–449.1
See application file for complete search history.

(56) References Cited

U.S. PATENT DOCUMENTS

| | | | | |
|---|---|---|---|---|
| 5,773,168 A | * | 6/1998 | Kubo ............. | H01M 4/525 |
| | | | | 29/623.5 |
| 6,085,015 A | * | 7/2000 | Armand .......... | H01M 4/136 |
| | | | | 385/140 |
| 2004/0197654 A1 | | 10/2004 | Barker et al. | |

(Continued)

FOREIGN PATENT DOCUMENTS

| | | |
|---|---|---|
| EP | 2 506 343 A2 | 10/2012 |
| EP | 2 541 655 A2 | 1/2013 |

(Continued)

OTHER PUBLICATIONS

International Search Report issued in PCT/KR2011/002230, dated Jan. 2, 2012.

(Continued)

*Primary Examiner* — Nicholas P D'Aniello
(74) *Attorney, Agent, or Firm* — Birch, Stewart, Kolasch & Birch, LLP

(57) ABSTRACT

Disclosed herein are a cathode for a secondary battery, which includes a combination of one or more selected from compounds represented by Formula 1 and or more selected from compounds represented by Formula 2, as illustrated below, and a secondary battery having the same, $$xLi_2MO_3*(1-x)LiM'O_2 \qquad (1)$$

$$(1-u)LiFePO_4*uC \qquad (2).$$

8 Claims, 2 Drawing Sheets

(51) Int. Cl.
*H01M 4/525* (2010.01)
*B60L 11/18* (2006.01)

(56) References Cited

U.S. PATENT DOCUMENTS

| | | | |
|---|---|---|---|
| 2005/0112054 A1 | 5/2005 | Eberman et al. | |
| 2006/0127767 A1* | 6/2006 | Gauthier et al. | 429/221 |
| 2006/0222952 A1* | 10/2006 | Kono et al. | 429/231.95 |
| 2008/0280203 A1 | 11/2008 | Yada et al. | |
| 2008/0311432 A1* | 12/2008 | Park et al. | 429/5 |
| 2009/0075165 A1 | 3/2009 | Park et al. | |
| 2009/0325072 A1* | 12/2009 | Maeda et al. | 429/220 |
| 2010/0086854 A1* | 4/2010 | Kumar | H01M 4/505 429/223 |

FOREIGN PATENT DOCUMENTS

| | | |
|---|---|---|
| JP | 2002-80448 A | 3/2002 |
| JP | 2002-110253 A | 4/2002 |
| JP | 2004-134245 A | 4/2004 |
| KR | 10-2005-0111631 A | 11/2005 |
| KR | 10-0570417 B1 | 4/2006 |
| KR | 10-2006-0097734 A | 9/2006 |
| KR | 10-2008-0109298 A | 12/2008 |
| KR | 10-2009-0030087 A | 3/2009 |
| KR | 10-2010-0002107 A | 1/2010 |

OTHER PUBLICATIONS

Johnson et al., "Synthesis, Characterization and Electrochemistry of Lithium Battery Electrodes: $xLi_2MnO_3 \cdot (1-x)LiMn_{0.333}Co_{0.333}Ni_{0.333}O_2$ ($0 \le x \le 0.7$)," Chemistry of Materials, vol. 20, No. 19, 2008 (published online Sep. 20, 2008), pp. 6095-6106.

Thackeray et al., "Advances in Manganese-oxide 'composite' Electrodes for Lithium-ion Batteries," Journal of Materials Chemistry, vol. 15, 2005 (published on web Mar. 10, 2005), pp. 2257-2267, XP007903619.

Whitacre et al., "Dual Active Material Composite Cathode Structures for Li-Ion Batteries," Journal of Power Sources, vol. 177, 2008 (Available online Jan. 10, 2008), pp. 528-536, XP22450300.

* cited by examiner

POSITIVE ELECTRODE FOR SECONDARY BATTERY

CROSS REFERENCE TO RELATED APPLICATIONS

This application is a Bypass Continuation of PCT International Application No. PCT/KR2011/002230 filed on Mar. 31, 2011, which claims priority under 35 U.S.C. §119(a) to Patent Application No. 10-2010-0029723 filed in the Republic of Korea on Apr. 1, 2010, all of which are hereby expressly incorporated by reference into the present application.

TECHNICAL FIELD

The present invention relates to a positive electrode for a secondary battery, more particularly, to a novel positive electrode for a secondary battery including a combination of at least two different compounds, so as to have long lifespan and favorable storage characteristics at room temperature and/or high temperature, and excellent safety.

BACKGROUND ART

Technological development and increased demand for mobile equipment have led to a rapid increase in the demand for secondary batteries. Among these secondary batteries, lithium secondary batteries having high energy density and output voltage, long cycle life and low self-discharge ratio are commercially available and widely used.

Recently, increased concern over environmental issues has brought about a great deal of research associated with electric vehicles (EV) and hybrid electric vehicles (HEV) as substitutes for vehicles using fossil fuels, such as gasoline vehicles and diesel vehicles, which are a major cause of air pollution. Although nickel metal hydride (Ni-MH) secondary batteries have mostly been used as a power source of such EV and/or HEV, a great deal of studies into use of lithium secondary batteries having high energy density and high discharge voltage are underway and some of these are commercially available.

Specifically, the lithium secondary battery used for EV must have high energy density and high output power in a short time and, in addition, be used even under severe ambient conditions for at least 10 years. Therefore, it is necessary for the above secondary battery to have excellent safety and long lifespan, as compared to existing small lithium secondary batteries.

A lithium ion secondary battery used as conventional small battery includes a lithium-cobalt composite oxide having a layered structure in a cathode and a graphite material in an anode. However, for such lithium-cobalt composite oxide, although cobalt is widely used as a main component, this material encounters disadvantages including, for example, high cost due to scarcity of cobalt, low safety, etc., thus having limitations in use as a power source in EV applications, and the like. As a cathode used in a lithium ion battery for EV, a spinel structure lithium manganese composite oxide comprising manganese, which is relatively cheap and has excellent safety, may be suitably used.

However, for lithium manganese composite oxides, manganese is dissolved in an electrolyte when the electrolyte is stored at a high temperature, in turn deteriorating characteristics of the battery. Therefore, improved techniques to prevent such deterioration in battery characteristics are required. In addition, compared to typical lithium cobalt composite oxides or lithium nickel composite oxides, the lithium manganese composite oxide has low capacity per unit mass, in turn causing limitation in capacity increase per unit mass of battery. Therefore, there is also a requirement for development and/or design of a novel battery to solve the foregoing problems, ultimately enabling utilization thereof as a power source for EV.

In order to overcome various weaknesses described above, a great deal of studies into fabrication of electrodes using mixed cathode active materials have recently been conducted. For instance, Japanese Laid-Open Patent Publications Nos. 2002-110253 and 2004-134245 disclose techniques for using mixtures of lithium manganese composite oxides and lithium nickel cobalt manganese composite oxides in order to increase regenerative output or the like. However, the lithium manganese oxide still entails some disadvantages such as poor cycle life and limitations in improving safety.

Meanwhile, in order to increase capacity and lifespan and/or improve high rate discharge characteristics of a battery, Korean Patent No. 0570417 discloses use of a spinel lithium manganese oxide ($LiMn_2O_4$) as a cathode active material; Japanese Laid-Open Patent Publication No. 2002-0080448 discloses use of a cathode active material containing lithium manganese composite oxide; and Japanese Laid-Open Patent Publication No. 2004-134245 discloses use of a cathode active material including a spinel lithium manganese composite oxide as well as a lithium transition metal composite oxide and, in addition, secondary batteries have been fabricated using the foregoing cathode active materials, respectively.

However, conventional technologies in the prior art have not yet proposed specific configurations of secondary batteries having sufficient lifespan and safety.

DISCLOSURE

Technical Problem

Accordingly, the present invention has been made to solve the above and other technical problems that have yet to be resolved.

As a result of a variety of extensive and intensive studies and experiments to solve the problems as described above, the inventors of the present invention have developed a positive electrode (hereinafter, referred to as a 'cathode') for a secondary battery including a combination of at least two different compounds represented by Formulae 1 and 2, respectively, and found that, when a secondary battery is fabricated using such cathode, safety, capacity and lifespan of the battery may be suitably improved and the battery may also have excellent rate properties and power characteristics. The present invention was completed based on this discovery.

Technical Solution

Therefore, in order to accomplish the foregoing purposes, according to an aspect of the present invention, there is provided a cathode for a secondary battery including a combination of: one or more selected from compounds represented by Formula 1, and one or more selected from compounds represented by Formula 2, as illustrated below:

$$xLi_2MO_3 * (1-x)LiM'O_2 \quad (1)$$

$$(1-u)LiFePO_4 * uC \quad (2)$$

In the above Formulae,

M is at least one element selected from metals having an oxidation number of +4, M' is at least one element selected from first and second period transition metals which have a 6-coordinate structure and are stabilized in a layered structure; $0<x<1$ and $0<u<0.1$; and u denotes a weight ratio.

M described above may be any metal having an oxidation number of +4 and, more preferably, include at least one element selected from a group consisting of Mn, Sn and Zr.

M' described above may be any one of first and second transition metals which have 6-coordinate structure and are stabilized in a layered structure and, more preferably, include at least one element selected from a group consisting of Ni, Mn and Co.

Each of M and M' may be partially substituted with metal or a non-metallic element having a 6-coordinate structure and, in this case, a substitution amount of each substitute element may be 0.1 mole ratio or less, relative to a total amount of M and M.' If the substitution amount is too large, desired capacity cannot be attained.

In Formulae 1 and 2, oxygen ions may be substituted in a predetermined amount by other anions. Such substitute anions may be one or two or more selected from a group consisting of F, Cl, Br, I, S, chalcogenide compounds and nitrogen.

Because of substitution by the foregoing anions, bonding to transition metals may be improved and structural transition of an active material may be successfully prevented, thereby increasing battery lifespan. However, if the substitution amount of anions is too large (more than 0.5 mole ratio relative to total moles of anions), the compound represented by Formula 2 may not maintain a stable structure, in turn deteriorating lifespan and thus not being preferable. Therefore, the substitution amount of anions may range from a mole ratio of 0.01 to 0.2, preferably, 0.01 to 0.1, relative to total moles of anions.

The cathode of the present invention shows a uniform potential region (that is, potential plateau) in a relatively high voltage region of 4.4 to 4.6V during first charging.

The compound represented by Formula 1 has advantages such as high capacity, low cost due to use of Mn in large quantities, etc., however, entails problems such as poor rate properties, decrease in lower end of a discharge voltage region, in turn not contributing to battery capacity when this compound is used for a mobile phone, or being a non-useable SOC region due to low output power when this compound is used for vehicles. As a result, a battery may not have improved output power.

The compound represented by Formula 2 has advantages such as low cost as well as excellent thermal safety and rate properties, however, a demerit of small volume, thus entailing limited applications in existing mobile phones, laptop computers, batteries for vehicles, etc.

On the other hand, the cathode of the present invention may suitably overcome weaknesses of the foregoing compounds while maximizing merits thereof. Therefore, according to the present invention, it is possible to fabricate batteries having excellent safety and performance as well as low cost.

The compound represented by Formula 1 may be a composite having a layered structure or in a solid solution form. In Formula 1 of the foregoing compound, x denotes a mole ratio.

With regard to the foregoing cathode, a ratio by weight of the compound represented by Formula 1 to the compound represented by Formula 2 may range from 3:7 to 9.5:0.5. Among these, if a content of the compound represented by Formula 1 is too low, desired capacity cannot be obtained. On the contrary, if a content of the compound represented by Formula 2 is too low, battery safety may be deteriorated, thus not being preferable. For such reasons, a ratio by weight of the compound represented by Formula 1 to the compound represented by Formula 2 may preferably range from 5:5 to 9.1.

Combination of such compounds represented by Formulae 1 and 2 may provide superior rate properties over a simple sum of respective rate properties of the above two compounds.

With regard to an olivine type lithium iron phosphate represented by Formula 2, olivine type lithium iron phosphate has very low conductivity as such and, therefore, the compound containing carbon with high conductivity in the form represented by Formula 2 is preferably used. The carbon in the above compound is more preferably coated on the surface of the olivine type lithium iron phosphate.

According to a preferred embodiment of the present invention, Fe sites in the compound represented by Formula 2 may be doped with other transition metals or a stable element for an octahedral structure, in a small doping amount. Also, a stable material for a tetrahedral structure may dope phosphorous (P) sites in the compound represented by Formula 2. Such stable material for a tetrahedral structure may be one or two or more selected from a group consisting of Si, V and Ti. A preferred doping amount may range from 0.01 to 0.2 mole, more preferably, 0.01 to 0.1 mole.

The inventive cathode may be formed by mixing a cathode mix containing the foregoing compounds in a solvent such as NMP (N-Methylpyrrolidone) to prepare a slurry, and then, applying the prepared slurry to a cathode current collector, drying and rolling the same.

Such cathode may further include a conductive material, a binder, a filler, in addition to the compounds described above.

The conductive material may be added in an amount of 1 to 30 wt. %, relative to a total weight of a mixture containing a cathode active material. Such conductive material is not particularly restricted so long as it has conductive properties without causing chemical modification of a battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder assists in combination of an active material with a conductive material and bonding to a current collector and is normally added in an amount of 1 to 30 wt. %, relative to a total weight of a mixture containing a cathode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, various copolymers, and so forth.

The filler is a supplementary ingredient to inhibit expansion of a cathode, is optionally used and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

The cathode current collector described above is generally fabricated to have a thickness in the range of 3 to 500 µm. Such cathode current collector is not particularly restricted so long as it has conductivity without causing chemical modification of a battery. For example, the cathode current collector may be fabricated using stainless steel, aluminum, nickel, titanium, calcined carbon, or aluminum or stainless steel surface-treated with carbon, nickel, titanium or silver, and so forth. The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The present invention also provides a lithium secondary battery including the cathode described above, an anode, a separator and a non-aqueous electrolyte containing lithium salts. The lithium secondary battery according to the present invention may include a combination of the compound represented by Formula 1 and the compound represented by Formula 2, thus having a potential plateau in the 4.4 to 4.6V region during initial charging.

The anode used herein is fabricated by, for example, applying an anode mix containing an anode active material to an anode current collector then drying the coated collector. In this case, the anode mix may optionally include the foregoing components.

The anode current collector is generally fabricated to have a thickness in the range of 3 to 500 µm. Such anode current collector is not particularly restricted so long as it has high conductivity without causing chemical modification of a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth. Similar to the cathode current collector, the anode current collector may be processed to have fine irregularities on the surface thereof, so as to enhance adhesion to an electrode active material. In addition, the anode current collector may have various forms including films, sheets, foils, nets, porous structures, foams, non-woven fabrics, etc.

The separator used herein is interposed between the cathode and the anode and may be formed using a thin insulation film having a high ion permeability and excellent mechanical strength. The separator typically has a pore diameter of 0.01 to 10 µm and a thickness of 5 to 300 µm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

The non-aqueous electrolyte containing lithium salt used herein comprises a lithium salt as well as a non-aqueous electrolyte. The non-aqueous electrolyte may be a non-aqueous organic solvent, organic solid electrolyte, inorganic solid electrolyte, or the like.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, or the like.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—NiOH, $Li_3PO_4$—$Li_2S$—$SiS_2$, etc.

The lithium salt used herein is a material readily dissolved in the non-aqueous electrolyte and may include, for example, LiCl, LiBr, LiI, $LiCl_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas and, in addition, fluoro-ethylene carbonate (FEC), propene sultone (PRS), fluoro-ethylene carbonate (FEC), etc.

The secondary battery fabricated according to the present invention may be used for a battery cell which is a power source for a small device, and also be employed as a unit cell of a medium and/or large-scale battery module having a plurality of battery cells.

Preferred examples of medium and/or large-scale devices described herein may include: battery operated power tools; electric automobiles including, for example, electric vehicles (EV), hybrid electric vehicles (HEV), plug-in hybrid electric vehicles (PHEV), etc.; electric two-wheel vehicles including, for example, electric bikes, electric scooters, etc.; electric golf carts, and so forth, without being particularly limited thereto.

BRIEF DESCRIPTION OF THE DRAWINGS

The above and other objects, features and other advantages of the present invention will be more clearly understood from the following detailed description taken in conjunction with the accompanying drawings, in which.

BEST MODE

The present invention will be described in more detail with reference to the following Examples. These examples are provided only to illustrate the present invention and should not be construed as limiting the scope and spirit of the present invention.

EXAMPLE 1

Two compounds, $0.5Li_2MnO_3*0.5LiNi_{0.5}Mn_{0.5}O_2$ and $0.98LiFePO_4.0.02C$ were mixed in a relative ratio by weight of 7:3 to prepare a cathode active material. Then, the prepared cathode active material was mixed with a conductive material and a binder in a ratio by weight of 92:4:4 (that is, active material:conductive material:binder) to obtain a cathode mix. Here, the ratio of 0.5:0.5 is a mole ratio while the ratio of 0.98:0.02 is a weight ratio.

EXAMPLE 2

A cathode mix was prepared by the same procedures as described in Example 1, except that the ratio by weight of the two compounds described above was 8:2.

EXAMPLE 3

A cathode mix was prepared by the same procedures as described in Example 1, except that the ratio by weight of the two compounds described above was 9:1.

EXAMPLE 4

A cathode mix was prepared by the same procedures as described in Example 1, except that two compounds, $0.5Li_2MnO_3*0.5LiNi_{0.375}Mn_{0.375}Co_{0.25}O_2$ and $0.98LiFePO_4.0.02C$ were mixed in a relative ratio by weight of 9:1 to prepare a cathode active material. Here, the ratio of 0.5:0.5 is a mole ratio while the ratio of 0.98:0.02 is a weight ratio.

COMPARATIVE EXAMPLE 1

A cathode mix was prepared by the same procedures as described in Example 1, except that the compound $0.5Li_2MnO_3*0.5LiNi_{0.5}Mn_{0.5}O_2$ was used alone as a cathode active material. Here, the ratio of 0.5:0.5 is a mole ratio.

COMPARATIVE EXAMPLE 2

A cathode mix was prepared by the same procedures as described in Example 1, except that the compound $0.5Li_2MnO_3*0.5LiNi_{0.375}Mn_{0.375}Co_{0.25}O_2$ was used alone as a cathode active material. Here, the ratio of 0.5:0.5 is a mole ratio.

EXPERIMENTAL EXAMPLE 1

Each of the cathode mixes prepared in Examples 1 to 4 and Comparative Examples 1 and 2 was processed through punching to form a coin type cathode, in turn fabricating two coin type cells. Li-metal was used as an anode active material while 1M $LiPF_6$ dissolved in a carbonate electrolyte was used as an electrolyte. The fabricated cell was subjected to charging to 4.8V and discharging to 2.5V at 0.1 C during $1^{st}$ cycle, and then, charging to 4.5V and discharging to 2.5V at 0.2 C during $2^{nd}$ cycle. Thereafter, in order to determine rate properties, the cell was subjected to charging to 4.5V at 0.5 C and discharging to 2.5V at 0.1 C, 0.2 C, 0.5 C, 1.0 C, 1.5 C and 2.0 C, respectively, during $3^{rd}$ to $8^{th}$ cycles. From the $9^{th}$ cycle on, charging-discharging at 0.5 C was implemented to measure cycle life properties. Measured results are shown in graphs of FIGS. 1 and 2.

Figure 1:
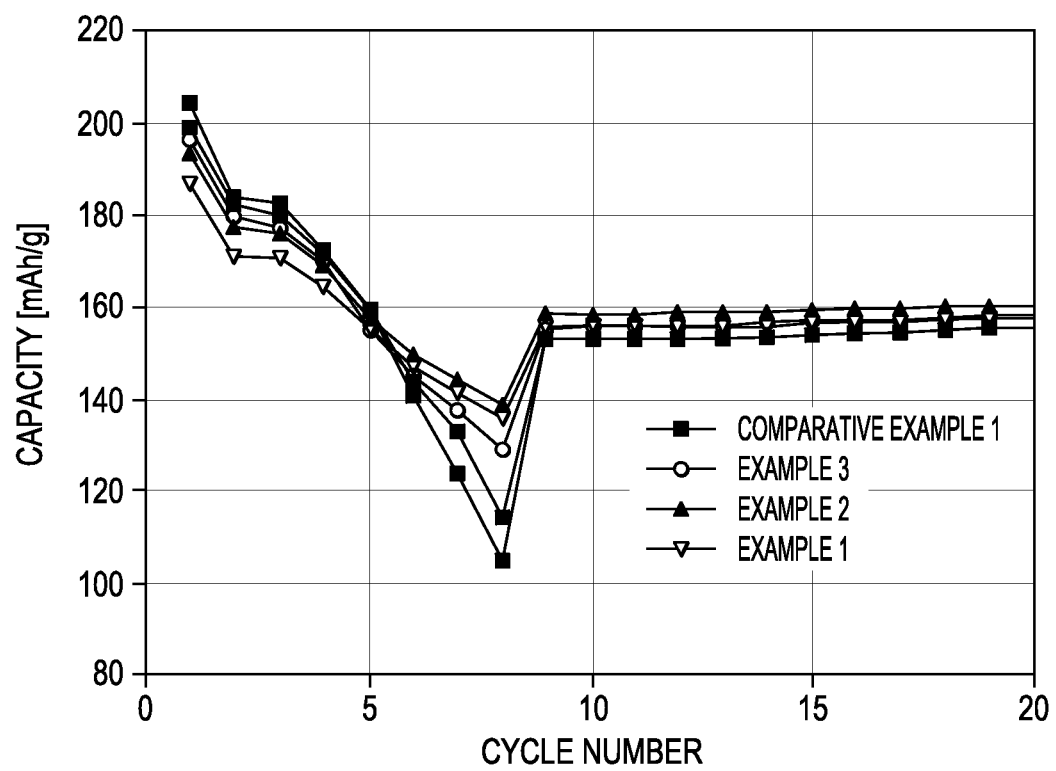
FIG. 1 is graphs showing rate properties and cycle life properties of materials prepared in Examples 1 to 3 and Comparative Example 1, which were obtained according to Experimental Example 1.
Figure 2:
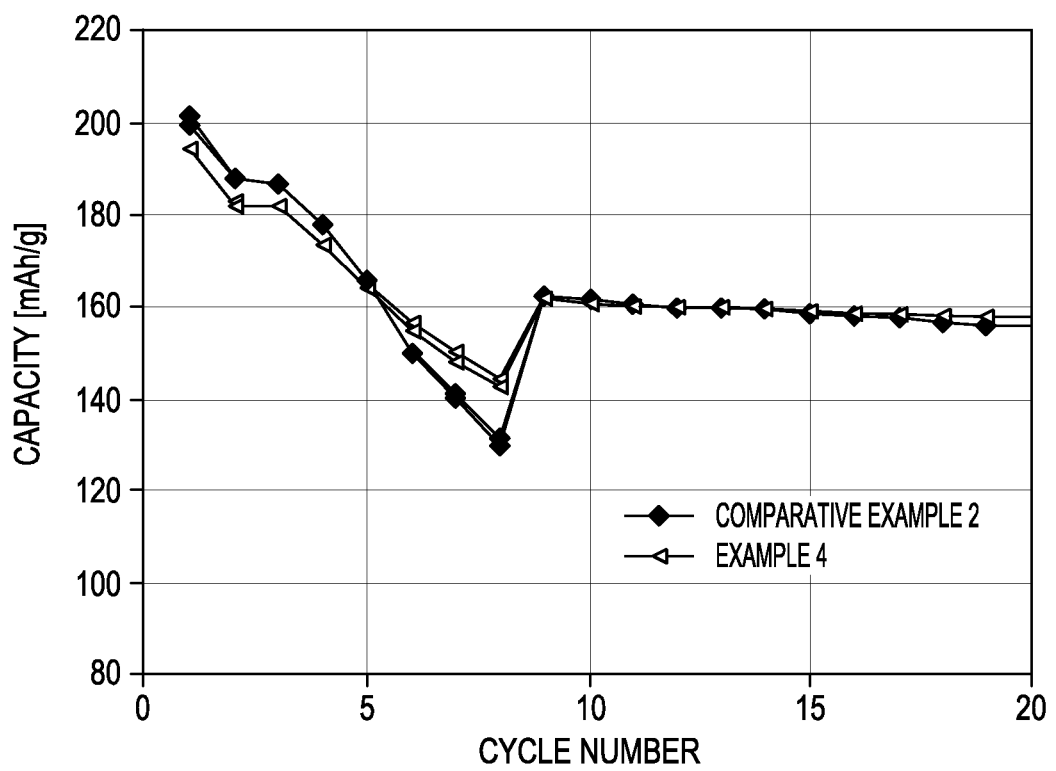
FIG. 2 is graphs showing rate properties and cycle life properties of materials prepared in Example 4 and Comparative Example 2, which were obtained according to Experimental Example 2.

As shown in FIGS. 1 and 2, it can be seen that a cell (that is, a battery) fabricated using a combination of two active materials according to the present invention exhibits rapidly improved rate properties during high rate discharging (specifically, discharging at 2.0 C during $8^{th}$ cycle), even though a small amount of the combination is added, compared to a battery comprising a single active material. In general, a battery used as a power source for vehicles requires high rate charging-discharging. Also, even for a small battery, the battery shows absolutely different behaviors depending upon a thickness of an electrode included in the battery. Therefore, it is very important for a battery to have excellent rate properties. In view of such, a combination of the foregoing two active materials may overcome problems in use of a single active material and, in addition, achieve unexpectedly high synergistic effects, which are substantially not derived from prior art. Those skilled in the art will appreciate that various modifications and alterations are possible, based on the foregoing description, without departing from the scope and spirit of the invention as defined in the appended claims.

INDUSTRIAL APPLICABILITY

As is apparent from the foregoing description, a non-electrolyte secondary battery fabricated using a cathode that contains a mixture of a specific lithium transition metal composite oxide and a specific lithium iron phosphate according to the present invention, may ensure safety and have high capacity and economical advantages such as low cost.

The invention claimed is:

1. A cathode for a secondary battery, comprising a combination of:
   one or more selected from compounds represented by Formula 1; and
   one or more selected from compounds represented by Formula 2, $$xLi_2MO_3*(1-x)LiM'O_2 \quad (1)$$

$$(1-u)LiFePO_4*uC \quad (2)$$

wherein M is at least one element selected from the group consisting of Mn, Sn and Zr; M' is at least one element selected from the group consisting of Ni, Mn and Co; 0<x<1 and 0<u<0.1; and u denotes a weight ratio,
   wherein the compound represented by Formula 1 and the compound represented by Formula 2 are contained in a relative ratio by wight ranging from 7:3 to 9:1,
   wherein phosphouous (P) sites in the compound represented by Formula 2 are doped with a stable material for a tetrahedral structure, and
   wherein the stable material for a tetrahedral structure is one, two or more selected from the group consisting of Si, V and Ti.

2. The cathode according to claim 1, wherein M comprises Mn.

3. The cathode according to claim 1, wherein the cathode exhibits a potential plateau in the 4.4 to 4.6V region during initial charging.

4. The cathode according to claim 1, wherein M, M' and Fe in Formulae 1 and 2 are substituted with metals or non-metallic elements which have a 6-coordinate structure, in a predetermined substitution amount.

5. A secondary battery having the cathode as set forth in claim 1.

6. A medium and/or large-scale battery pack including the lithium secondary battery according to claim 5 as a unit cell.

7. The cathode according to claim 1, wherein the compound represented by Formula 1 is a composite having a layered structure or a solid solution.

8. The cathode according to claim 1, wherein oxygen (O) ions in Formulas 1 and 2 are substituted with anions selected from the group consisting of F, Cl, Br, I, S, chalcogenide compounds and nitrogen in a substitution amount, and
   wherein a substitution amount of the anions ranges from a mole ratio of 0.01 to 0.2.

\* \* \* \* \*